(12) United States Patent
Szabo et al.

(10) Patent No.: US 8,280,956 B2
(45) Date of Patent: Oct. 2, 2012

(54) USER BEHAVIOR BASED MOBILE BROADBAND USER PLANE TRAFFIC GENERATION SYSTEM AND METHOD FOR REAL-LIKE MEASUREMENT GENERATION

(75) Inventors: Geza Szabo, Kecskemet (HU); Gergely Pongrácz, Budapest (HU); Zoltán Richárd Turányi, Szentendre (HU)

(73) Assignee: Telefonakitiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 12/857,684

(22) Filed: Aug. 17, 2010

(65) Prior Publication Data
US 2012/0047200 A1   Feb. 23, 2012

(51) Int. Cl.
*G06F 15/16* (2006.01)
(52) U.S. Cl. .......................... 709/203; 709/204
(58) Field of Classification Search .................. 709/203
See application file for complete search history.

(56) References Cited

U.S. PATENT DOCUMENTS

| 7,376,550 | B1 | 5/2008 | Bokaemper et al. |
| 2008/0239972 | A1 | 10/2008 | Hassan et al. |
| 2009/0319247 | A1* | 12/2009 | Ratcliffe et al. ............. 703/13 |
| 2011/0022701 | A1* | 1/2011 | Prescott ...................... 709/224 |

FOREIGN PATENT DOCUMENTS
EP   1 480 379 B1   12/2007

OTHER PUBLICATIONS

Shriram, A. et al. Comparison of Public End-to-End Bandwidth Estimation Tools on High-Speed Links. Passive and Active Network Measurement Workshop. vol. 3431. Mar. 1, 2005.
Schoenwaelder, J. Simple Network Management Protocol (SNMP) Traffic Measurements and Trace Exchange Formats. Network Working Group. Request for Comments: 5345. Oct. 1, 2008.
Paul E. Heegaard. GenSyn—a Java Based Generator of Synthetic Internet Traffic Linking User Behaviour Models to Real Network Protocols. In ITC Specialist Seminar on IP Traffic Measurement, Modeling and Management, Sep. 18-20, 2000.

* cited by examiner

*Primary Examiner* — Hua Fan

(57) ABSTRACT

A system, a method, and a graphical user interface testing tool are described herein for constructing a validation trace (i.e., high-speed realistic network traffic) using a real network without causing privacy concerns. In one embodiment, the method comprises the steps of: (a) providing a client device which has one or more applications operating thereon and a graphical user interface; (b) recording user interactions on the client device; (c) extracting usage scenarios from real network traffic in the real network; (d) emulating user actions on the client device according to a specific user scenario by utilizing the recorded user interactions and the extracted usage scenarios to generate additional real traffic in the real network; and (e) creating the validation trace based on the generated additional real traffic and the extracted usage scenarios.

20 Claims, 5 Drawing Sheets

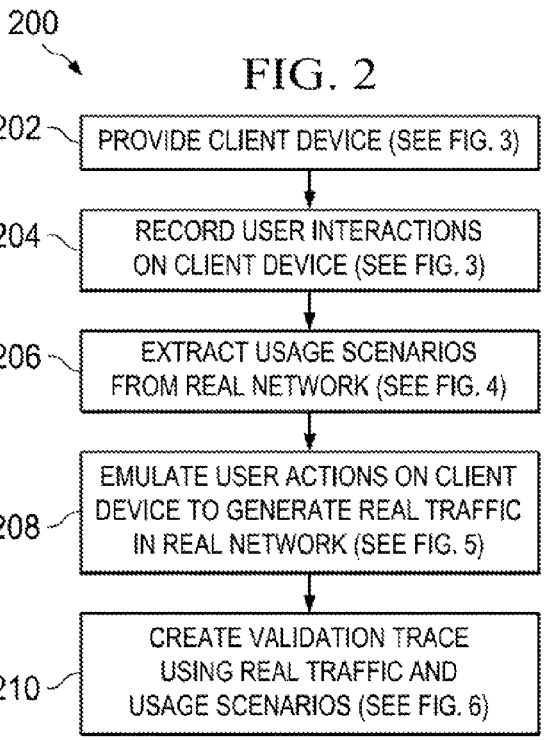
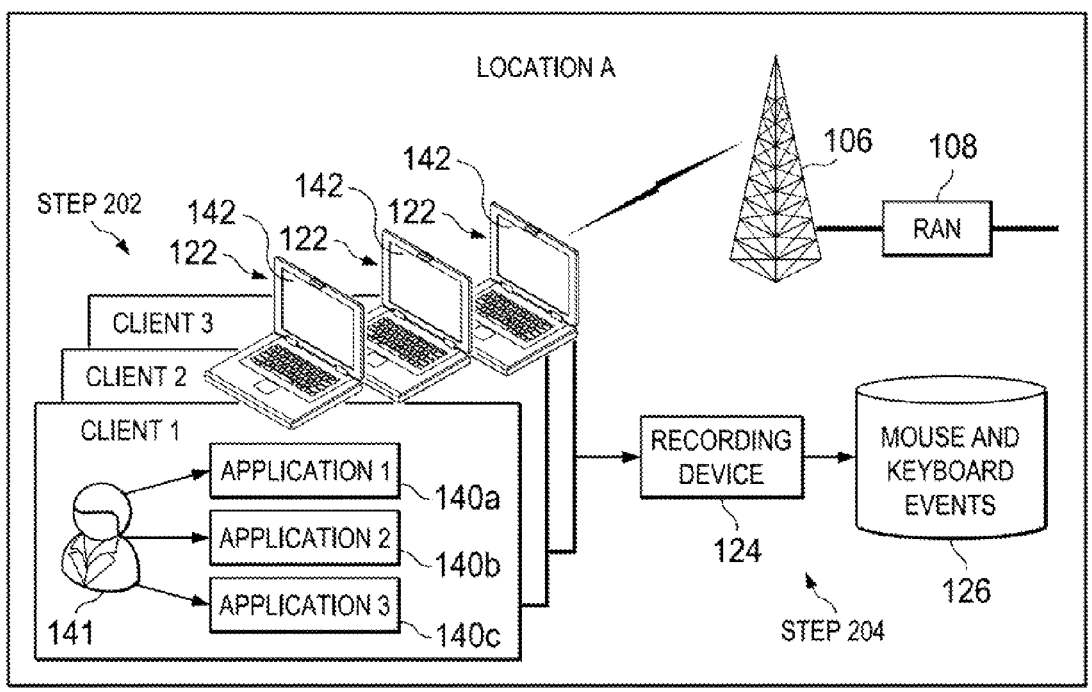

USER BEHAVIOR BASED MOBILE BROADBAND USER PLANE TRAFFIC GENERATION SYSTEM AND METHOD FOR REAL-LIKE MEASUREMENT GENERATION

TECHNICAL FIELD

The present invention relates in general to a system, a method, and a graphical user interface testing tool configured to construct a validation trace (i.e., high-speed realistic network traffic) using a real network without causing privacy concerns.

BACKGROUND

The following abbreviations are herewith defined, at least some of which are referred to within the following description of the prior art and the present invention.
DPI Deep Packet Inspection
HTTP Hypertext Transfer Protocol
ISP Internet Service Providers
P2P Peer-to-peer
QoS Quality of Service
RAN Radio Access Network
RNC Radio Network Controller
SMTP Simple Mail Transfer Protocol
TCP/IP Transmission Control Protocol/Internet Protocol In-depth understanding of a profile for Internet traffic is a challenging task for researchers and a mandatory requirement for most Internet Service Providers (ISP). To this end, Deep Packet Inspection (DPI) tools help ISPs in the quest for profiling networked applications. With this information in hand, ISPs may then apply different charging policies, traffic shaping, and offer different QoS guarantees to selected users or applications.

DPI tools search the traffic in a stateless manner for frequently occurring protocol fragments referred to in the art as signatures to recognize a specific application in a data stream. DPI tools can be tested in terms of accuracy as well as performance, where accuracy is the ratio of well-classified traffic and the total traffic of a specific application and performance shows the number of tested signatures for a given size (specific bandwidth) of traffic in a fix period of time. In this regard, it is well known that increasing accuracy by adding more and more signatures to the application-signature database negatively affects performance. The goal of the developers of DPI tools is to provide high enough accuracy in real world telecommunication networks with the highest possible performance.

The best solution to help meet this goal is to enable DPI tools to use measurements from a real telecommunications network, but the network data is the property of the operator and there are plenty of privacy issues can arise. As such, the most common solution used today for meeting this goal is to enable DPI tools to use measurements from user traffic simulators which mimic several application level network protocols (e.g., HTTP, SMTP), transport layer network protocols (e.g., TCP/IP), and user behavior (e.g., Poisson arrival). However, simulators are not very flexible. For instance, simulators can only mimic extreme scenarios e.g., when the transport network utilizes the full bandwidth or when the packets arrive with a limited speed. In practice, the traffic is more elastic and difficult to simulate when compared to real world scenarios. Plus, simulators can only simulate such traffic which is encoded in them and to create up-to-date traffic the simulator has to be updated with the most up-to-date signatures. To this end, the simulator would practically need to know the whole protocol and replay the protocol to create valid conversations between the network parties. This whole process is an overhead which can be saved if the DPI tools could use measurements (validation traces) obtained by using real protocols in a real network environment. Thus, there is a need for a system that can provide an in-depth understanding of a traffic profile by constructing a validation trace (i.e., high-speed realistic network traffic) using a real network without causing privacy concerns. This need and other needs are satisfied by the system and method of the present invention.

SUMMARY

A system, a graphical user interface tool, and methods have been described in the independent claims of the present application. Advantageous embodiments of the system, the graphical user interface tool, and the methods have been described in the dependent claims.

In one aspect, the present invention provides a method for constructing a validation trace using a real network without causing privacy concerns. The method comprises the steps of: (a) providing a client device which has one or more applications operating thereon and a graphical user interface; (b) recording user interactions on the client device; (c) extracting usage scenarios from real network traffic in the real network; (d) emulating user actions on the client device according to a specific user scenario by utilizing the recorded user interactions and the extracted usage scenarios to generate additional real traffic in the real network; and (d) creating the validation trace based on the generated additional real traffic and the extracted usage scenarios. The method has an advantage in that it can be used to record the interactions on the real network which would not be a privacy issue because the user actions are emulated on the client device (not actual user) utilizing information namely the extracted usage scenarios and the recorded user interaction which do not contain data identifying a specific "real" user or a specific "real" device but has enough usage information to generate the validation trace.

In yet another aspect, the present invention provides a system for constructing a validation trace using a real network without causing privacy concerns. The system comprises a client device, a recording device, an extracting device, a graphical user interface testing tool, and a creating device. The client device has one or more applications operating thereon and a graphical user interface. The recording device records user interactions on the client device. The extracting device extracts usage scenarios from real network traffic in the real network. The graphical user interface testing tool emulates user actions on the client device according to a specific user scenario by utilizing the recorded user interactions and the extracted usage scenarios to generate additional real traffic in the real network. The creating device creates the validation trace based on the generated additional real traffic and the extracted usage scenarios. The system has an advantage in that it can record the interactions on the real network which would not be a privacy issue because the user actions emulated on the client device (not actual user) utilize information namely the extracted usage scenarios and the recorded user interaction which do not contain data identifying a specific "real" user or a specific "real" device but has enough usage information to generate the validation trace.

In still yet another aspect, the present invention provides a graphical user interface testing tool for constructing a validation trace using a real network without causing privacy concerns. The graphical user interface testing tool comprises: (a) a processor; and (b) a memory that stores processor-executable instructions wherein the processor interfaces with the memory and executes the processor-executable instructions to: (i) obtain user interactions that were recorded when a user interacted with a client device which has one or more applications operating thereon and a graphical user interface; (ii) obtain usage scenarios that were extracted from real network traffic in the real network; (iii) emulate user actions on the client device according to a specific user scenario by utilizing the user interactions and the usage scenarios to generate additional real traffic in the real network; and (iv) store the generated additional real traffic, wherein the stored generated additional real traffic and the usage scenarios are used to create the validation trace. The graphical user interface testing tool has an advantage in that it can be used to construct a validation trace without causing a privacy issue because the user actions emulated on the client device (not actual user) utilize information namely the extracted usage scenarios and the recorded user interaction which do not contain data identifying a specific "real" user or a specific "real" device but has enough usage information to generate the validation trace.

In still yet another aspect, the present invention provides a method implemented by graphical user interface testing tool for constructing a validation trace using a real network without causing privacy concerns. The method comprising the steps of: (a) obtaining user interactions that were recorded when a user interacted with a client device which has one or more applications operating thereon and a graphical user interface; (b) obtaining usage scenarios that were extracted from real network traffic in the real network; (c) emulating user actions on the client device according to a specific user scenario by utilizing the user interactions and the usage scenarios to generate additional real traffic in the real network; and (d) storing the generated additional real traffic, wherein the stored generated additional real traffic and the usage scenarios are used to create the validation trace. The method has an advantage in that it can be used to construct a validation trace without causing a privacy issue because the user actions emulated on the client device (not actual user) utilize information namely the extracted usage scenarios and the recorded user interaction which do not contain data identifying a specific "real" user or a specific "real" device but has enough usage information to generate the validation trace.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 2 is a flowchart illustrating the steps of an exemplary method for constructing a validation trace (high speed realistic network traffic) using a real network in accordance with an embodiment of the present invention;

FIG. 3 is a block diagram of a portion of the system and real network shown in FIG. 1 which is used to help explain in greater detail how a proving step (step 202) and recording step (step 204) of the method shown in FIG. 2 can be performed in accordance with an embodiment of the present invention;

DETAILED DESCRIPTION

Figure 1:
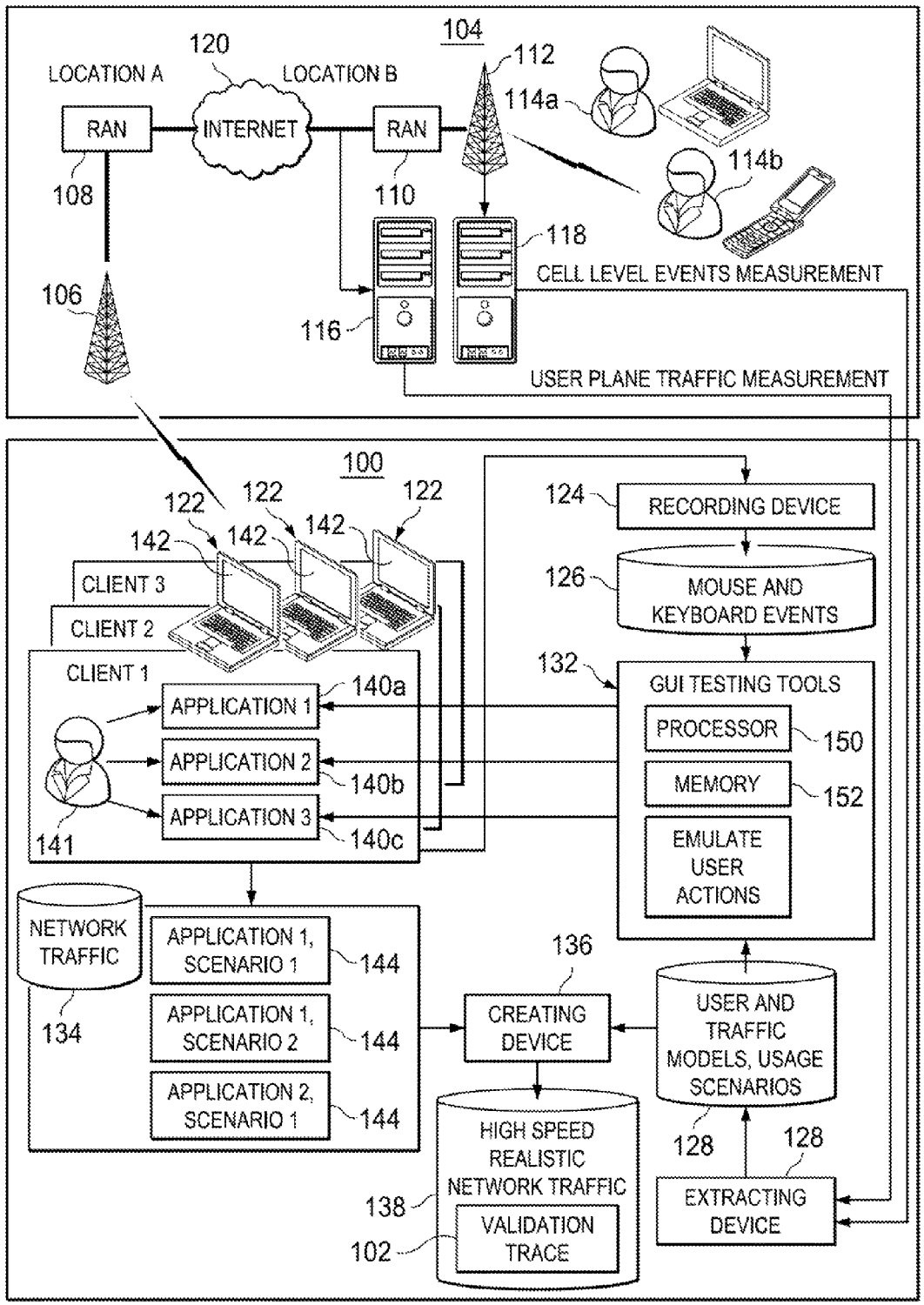
FIG. 1 is a block diagram of an exemplary system for constructing a validation trace (high speed realistic network traffic) using a real network in accordance with an embodiment of the present invention.

Referring to FIGS. 1 and 2, there are respectively shown a block diagram of an exemplary system 100 and a flowchart of a method 200 for constructing a validation trace 102 (high speed realistic network traffic 102) using a real network 104 in accordance with an embodiment of the present invention. In this example, the real network 104 has components located in two locations A and B. The components located in location A include a transmission station 106 which is connected via a wired connection to a RAN 108. The components located in location B include a RAN 110, a transmission station 112, multiple subscribers 114a and 114b (only two shown), a user plane traffic database 116, and a cell level events measurement database 118. The RAN 108 is connected to RAN 110 via the internet 120. In addition, the RAN 110 is connected via a wired connection to the transmission station 112 which is connected via wireless connections to the subscribers 114a and 114b. The user plane traffic database 116 stores user plane measurements which are taken from one or more connections between the RAN 110 and the internet 120. The cell level events measurement database 118 stores cell level events taken from the transmission station 112. One skilled in the art will readily appreciate that the real network 104 shown is exemplary and omits many components which are not needed to explain how the system 100 constructs the validation trace 102 (high speed realistic network traffic 102) in accordance with the present invention.

The system 100 includes one or more client devices 122, a recording device 124, a mouse and keyboard events database 126, an extracting device 128, a user and traffic models database 130, a graphical user interface testing tool 132, a network traffic database 134, a creating device 136, and a high speed realist network traffic database 138. The client device (s) 122 are shown located in location A and connected via wireless connections to the real network's transmission station 106 (step 202 in FIG. 2). Each client device 122 has one or more applications 140a, 140b and 140c operating thereon and a GUI 142. The recording device 124 connects to the client devices 122, records the user interactions on the client devices 122, and stores the recorded user interactions in the mouse and keyboard events database 126 (step 204 in FIG. 2). The extracting device 128 connects to the user plane traffic database 116 and the cell level events measurement database 118, extracts usage scenarios from real network traffic in the real network 104, and stores the extracted usage scenarios in the user and traffic models database 130 (step 206 in FIG. 2).

The graphical user interface testing tool 132 emulates user actions on the client device(s) 122 according to a specific user scenario by utilizing the recorded user interactions obtained from the recording database 124 and the extracted usage scenarios obtained from the user and traffic models database 130 to generate additional real traffic 144 in the real network 104 (step 208 in FIG. 2). The network traffic database 134 stores the generated additional real traffic 144. The creating device 136 creates the validation trace 102 based on the generated additional real traffic 144 (stored in the network traffic database 134) and the extracted usage scenarios (stored in the user and user and traffic models database 130) (step 210 in FIG. 2). The creating device 136 then stores the validation trace 102 within the high speed realistic network traffic database 138. A more detailed discussion about how the system 100 can be used to perform steps 202, 204, 206, 208 and 210 to construct the validation trace 102 is provided below with respect to FIGS. 3-6.

Referring to FIG. 3, there is shown a block diagram of a portion of the system 100 and real network 104 which is used to help explain in greater detail how the providing step 202 and the recording step 204 of method 200 can be performed in accordance with an embodiment of the present invention. In this stage, the client device(s) 122 (three shown) are located in location A and connected via wireless connections to the real network's transmission station 106 (step 202 in FIG. 2). Each client device 122 has one or more applications 140a, 140b and 140c operating thereon and the GUI 142. Thus, when a new application is added to the real network 104 or one of the GUI's applications 140a, 140b and 140c has changed significantly, a user 141 will interact with the client device 122 and use the new or changed application while the recording device 124 records the user interactions with the GUI 142 (step 204 in FIG. 2). The recording step 204 typically involves the naming of the input fields, buttons, etc. not the exact location of the mouse cursor. Thus, the recording step 204 is actually robust to changes in the client device's GUI 142. The recorded user interactions are stored within the mouse and keyboard events database 126. It should be noted that the look and feel of the client device's GUI 142 would typically change less frequently than the underlying network protocol: e.g., Skype had the same skin from version 1-3 and it has been radically changed only in version 4. On the other hand, the underlying network protocol was changed approximately ~100 times during every sub-version.

Figure 4:
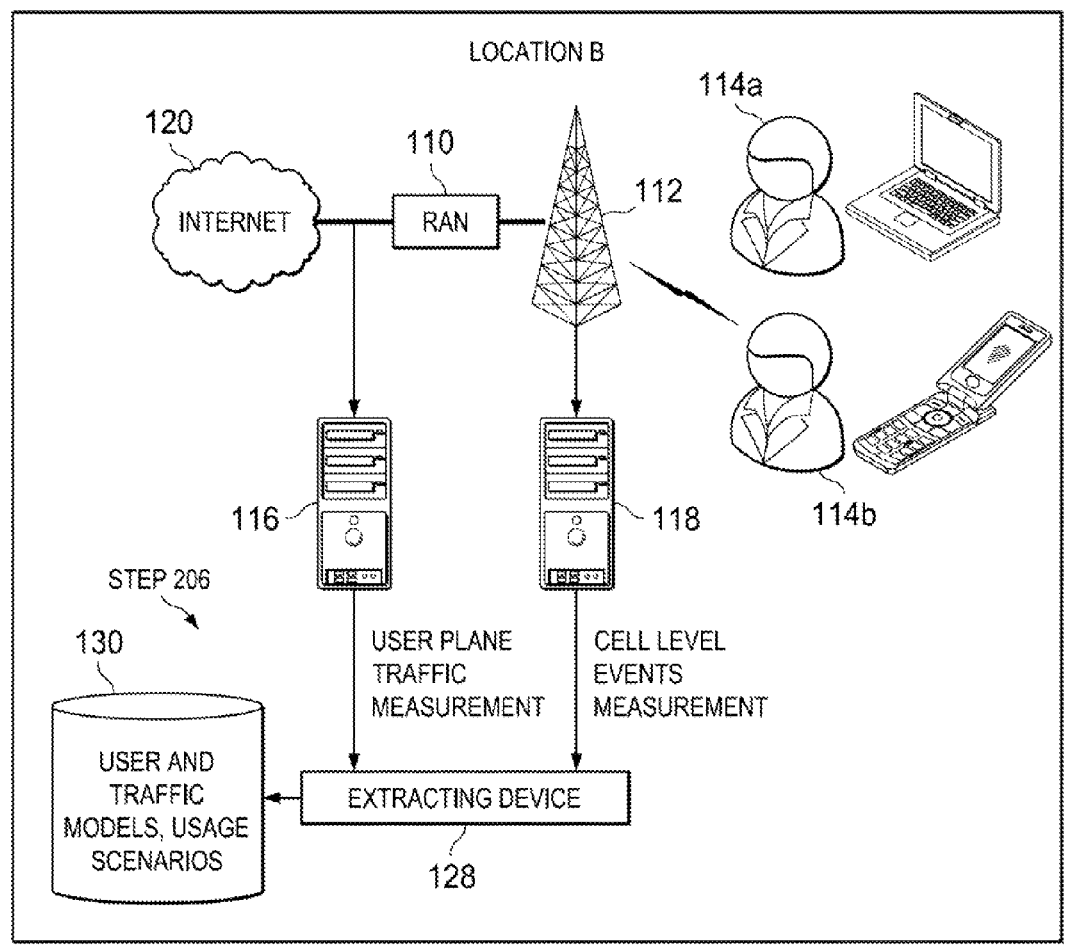
FIG. 4 is a block diagram of a portion of the system and real network shown in FIG. 1 which is used to help explain in greater detail how an extracting step (step 206) of the method shown in FIG. 2 can be performed in accordance with an embodiment of the present invention.

Referring to FIG. 4, there is shown a block diagram of a portion of the system 100 and real network 104 which is used to help explain in greater detail how the extracting step 206 of method 200 can be performed in accordance with an embodiment of the present invention. In this stage, the extracting device 128 connects to the user plane traffic database 116 and the cell level events measurement database 118, extracts usage scenarios from real network traffic in the real network 104, and stores the extracted usage scenarios in the user and traffic models database 130 (step 206 in FIG. 2). In particular, the user plane traffic and cell level event measurements are taken in the real network 104 (e.g., real mobile broadband network 104) and stored in the user plane traffic database 116 and the cell level events measurement database 118. Then, typical traffic models and usage scenarios are extracted by the extracting device 128 from the user plane traffic database 116 and the cell level events measurement database 118 and stored in the user and traffic models database 130. The traffic models and usage scenarios extracted would typically not contain information identifying a specific "real" user 114a and 114b or a specific "real" device. The extracting step 206 can be done anytime with respect to the recording step 204 however it is desirable if the user and traffic models database 130 is up-to-date with respect to the recording step 204 as it's contents will have an affect on the quality of the final validation trace 102. In this regard, it is desirable to perform the recording step 204 and extracting step 206 in parallel but they can also be performed at different times if desired since the stored information can always be used to construct the resulting validation trace 102.

Figure 5:
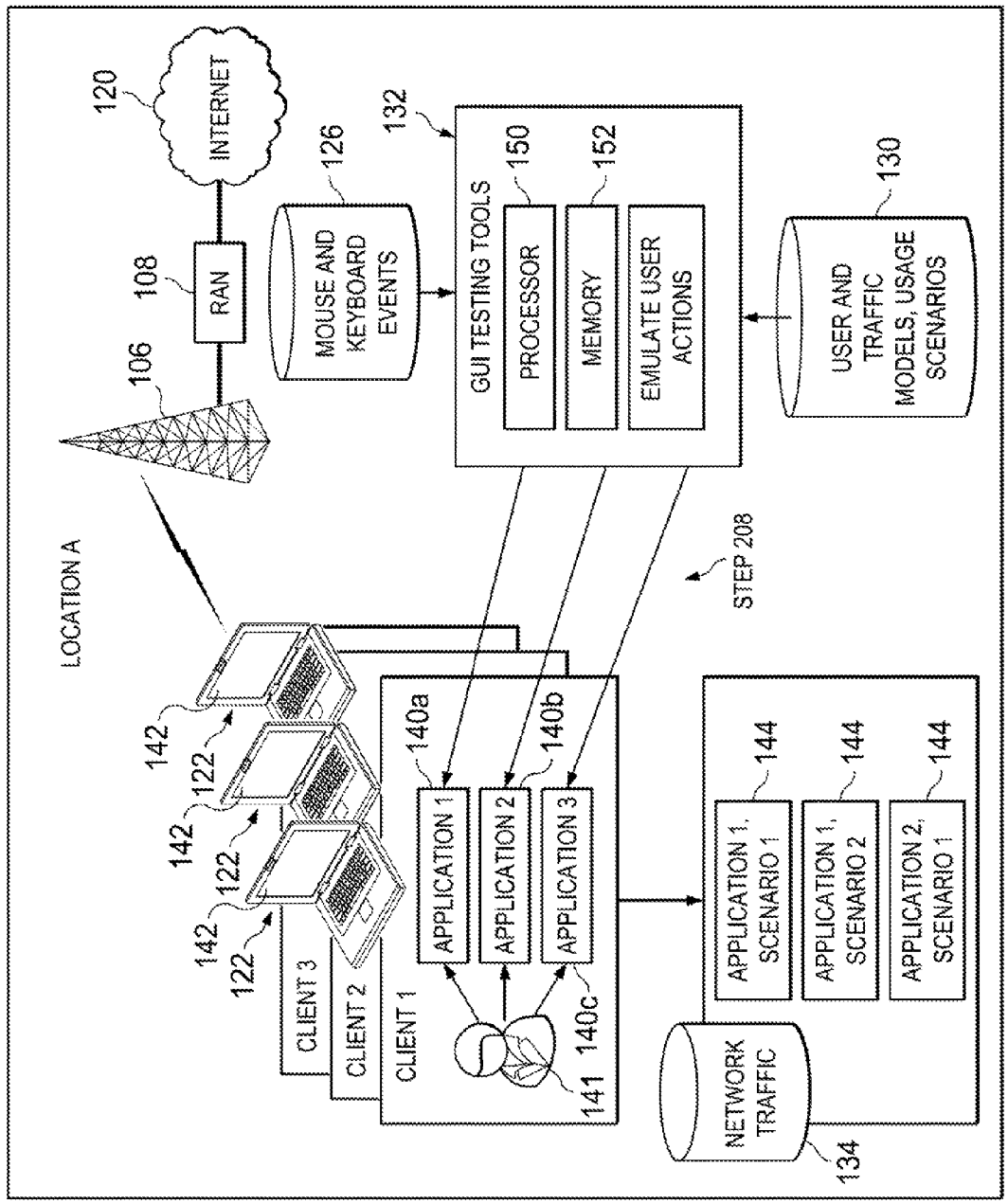
FIG. 5 is a block diagram of a portion of the system and real network shown in FIG. 1 which is used to help explain in greater detail how an emulating step (step 208) of the method shown in FIG. 2 can be performed in accordance with an embodiment of the present invention.

Referring to FIG. 5, there is shown a block diagram of a portion of the system 100 and real network 104 which is used to help explain in greater detail how the emulating step 208 of method 200 can be performed in accordance with an embodiment of the present invention. In this stage, the graphical user interface testing tool 132 emulates user actions on the client device(s) 122 according to a specific user scenario by utilizing the recorded user interactions obtained from the mouse and keyboard events database 126 and the extracted usage scenarios obtained from the user and traffic models database 130 to generate additional real traffic 144 in the real network 104 (step 208 in FIG. 2). The network traffic database 134 stores the generated additional real traffic 144. Typically, the graphical user interface testing tool 132 will emulate the user actions on the client device(s) 122 when an event occurs that triggers a need for a new up-to-date validation trace 102. For instance, the trigger event can include: (1) altering the version of the client device 122; (2) altering a protocol; and (3) altering user behavior, e.g., new applications, more users that utilize a lot of resources, a lot of new users to the operator, new handheld devices with different radio characteristics.

In operation, when an event is triggered such that a new up-to-date validation trace 102 is needed, the graphical user interface testing tool 132 obtains information from the recording database 124 and the user and traffic models database 130 and emulates the user actions on the client device(s) 122. In particular, the graphical user interface testing tool 132 drives one or more of the applications 140a, 140b and 140c on the client device(s) 122 using the information from the mouse and keyboard events database 126 according to a specific user scenario taken from the user and traffic models database 130 (input for the user emulation) to generate additional real traffic 144 in the real network 104. The network traffic database 134 is used to record the generated additional real traffic 144. Thus, the user of the graphical user interface testing tool 132 selects one of the several scenarios in the user and traffic models database 130 that resembles a specific scenario that they would like to reconstruct. Then, the graphical user interface testing tool 132 takes the necessary user actions from the mouse and keyboard events database 126 and emulates the user actions on the client device(s) 122 to generate additional real traffic 144 in the real network 104.

In one example, the specific usage scenario that can be tested involves a scenario where the effects of multiple applications 140a, 140b and 140c on each other are emulated e.g., web browsing with streaming radio and background P2P traffic. In this way, the effects that multiple applications 140a, 140b and 140c have on each other's traffic within the transport layer do not need to be simulated later. In another example, several access network types can be simulated where the client device(s) 122 access to the internet 120 would be throttled accordingly.

In other examples, the specific usage scenario to be tested may require the synchronization of two clients 122. For example, in the case of emulating Skype, two clients 122 need to be launched; the one making the call and the other receiving the call. The scripts replaying the GUI events to each Skype client 122 need to be synchronized for this to work. This synchronization can be achieved in several ways: (a) one way is that the answering party's Skype client 122 is set to automatic answering mode, thus in case of an incoming call it automatically picks it up and the call is established; or (b) the incoming call at the receiving party triggers the graphical user interface testing tool 132 to pick up the receiving party's Skype client 122 and establish the connection. Such event based and timer based conditional triggers can be set in GUI testing scripts of the graphical user interface testing tool 132.

The measurements for the generated additional real traffic 144 stored in the network traffic database 134 can be taken in a different location within the real network 104 than the measurements taken during the extracting step 206. For instance, if the client devices 122 are located close to each other then they are also likely to be connected to the same cell, hence the traffic on a cell level can be emulated using the graphical user interface testing tool 132. Thus, the total cell capacity for the user plane case can be simulated rather easy this way and can even be done by one user. However, the control plane traffic should not be simulated this way, as the load of the RNC (not shown) caused by a few client devices 122 in the system 100 is far less than in the real network 104.

Figure 6:
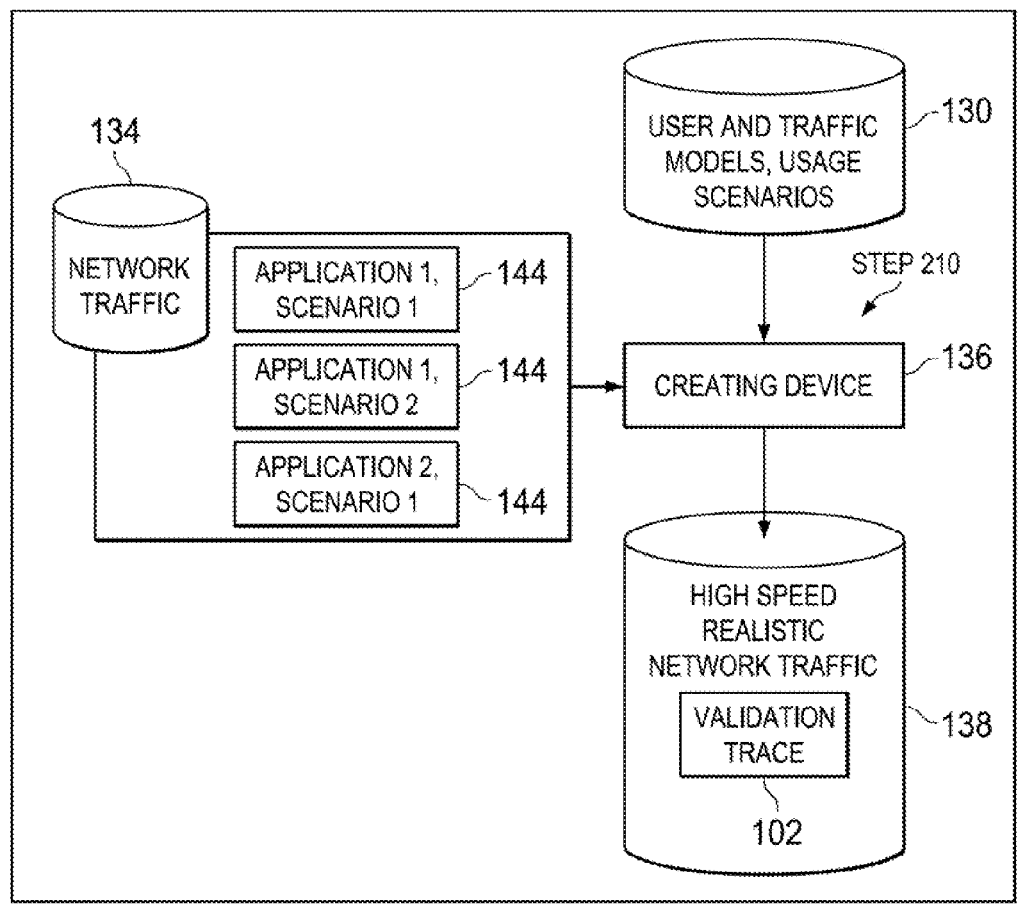
FIG. 6 is a block diagram of a portion of the system and real network shown in FIG. 1 which is used to help explain in greater detail how a creating step (step 210) of the method shown in FIG. 2 can be performed in accordance with an embodiment of the present invention.

Referring to FIG. 6, there is shown a block diagram of a portion of the system 100 and real network 104 which is used to help explain in greater detail how the creating step 210 of method 200 can be performed in accordance with an embodiment of the present invention. In this stage, the creating device 136 creates the validation trace 102 based on the generated additional real traffic 144 (stored in the network traffic database 134) and the extracted usage scenarios (stored in the user and user and traffic models database 130) (step 210 in FIG. 2). In particular, the creating device 126 multiplies the information in the user and user and traffic models database 130 and trace fragments of the generated additional real traffic 144 in the network traffic database 134 to create aggregated traffic which represents the validation trace 102. For instance, the aggregation phase of the creating step 210 can be performed by using tools editcap (e.g., http://www.wireshark.org/docs/wsug_html_chunked/AppToolseditcap.html) to modify the packet headers and then replay them with tcpreplay tools (e.g., http://tcpreplay.synfin.net/). In one basic example, the generated additional real traffic 144 may consist of such packets with headers that contain the IP of the few hosts taking part in the construction of the active measurement. However, the number of these packets are quite few and as such it would be beneficial to create a bigger user population virtually in which case the IP addresses in the measurements should be varied. With mergecap (which is also part of editcap tools) it is possible to merge several header modified trace files into a big one. Then, tcpreplay tools can be used to replay this big file on the real network 104. Alternatively, the aggregation phase of the creating step 210 can be performed by using more sophisticated aggregation tools following formal traffic models (e.g., Paul E. Heegaard. GenSyn—a Java based generator of synthetic Internet traffic linking user behaviour models to real network protocols. Presentation at ITC Specialist Seminar on IP Traffic Measurement, Modeling and Management, Sep. 18-20, 2000, Monterey, Calif. (USA)). The creating system 126 stores the validation trace 102 (e.g., high speed realistic network traffic 102) within the high speed realistic network traffic database 138.

From the foregoing, one skilled in the art will appreciate that the present invention is aimed, at least, to provide a system 100 and method 200 for constructing a validation trace 102 (e.g., high-speed realistic network traffic 102) using a real network 104 without causing privacy concerns. The system 100 can be used to record the interactions on the real network 104 which would not be a privacy issue because the graphical user interface testing tool 132 would emulate user actions on the tester's client device(s) 122 (not actual users) while using information about usage scenarios stored in the user and traffic models database 130 that lack information identifying a specific "real" user or a specific "real" device but has enough usage information to generate real like traces associated with the generated real traffic 144. Thus, the present invention has several advantages including (for example):

(1) The validation trace 102 is based on active measurements which can be made public without any privacy issues.

(2) The validation trace 102 is generated according to the most up-to-date application sessions and user scenarios.

(3) The process of generating the validation trace 102 is highly automatic.

(4) The validation trace 102 can be used for both performance and validation tests.

(5) The validation traffic 102 is based on real world traffic and has a payload that contains real data not simulated data.

In addition, one skilled in the art will appreciate that the validation trace 102 can be generated offline as well as online. In the online case, the validation trace 102 is created with the proposed system 100 on demand which requires a large amount of processing power but limited disk space. In the offline case, the validation trace 102 is generated by the system 100 slower than real-time and the result is saved to a disc (e.g., high speed realistic network traffic database 138) which is simply replayed later. In this last case, the processing requirements can be low but the required capacity of the disk (e.g., high speed realistic network traffic database 138) is high.

The present invention also provides a graphical user interface testing tool 132 (and method implemented by same) that construct a validation trace 102 using a real network 104 without causing privacy concerns. The graphical user interface testing tool 132 comprises: (a) a processor 150; and (b) a memory 152 (non-transitory memory 152) that stores processor-executable instructions where the processor 150 interfaces with the memory 152 and executes the processor-executable instructions to: (1) obtain user interactions that were recorded when a user interacted with a client device 122 which has one or more applications 140*a*, 140*b* and 140*c* operating thereon and a graphical user interface 142; (2) obtain usage scenarios that were extracted from real network traffic in the real network 104; (3) emulate user actions on the client device 122 according to a specific user scenario by utilizing the user interactions and the usage scenarios to generate additional real traffic 144 in the real network 104; and (4) store the generated additional real traffic 144, wherein the stored generated additional real traffic and the usage scenarios are used to create the validation trace 102.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A method for constructing a validation trace using a real network without causing privacy concerns, the method comprising the steps of:
   providing a client device which has one or more applications operating thereon and a graphical user interface;
   recording user interactions on the client device;

extracting usage scenarios from real network traffic in the real network;

emulating user actions on the client device according to a specific user scenario by utilizing the recorded user interactions and the extracted usage scenarios to generate additional real traffic in the real network; and creating the validation trace based on the generated additional ea traffic and the extracted usage scenarios.

2. The method of claim 1, wherein the recording step further includes the steps of:

enabling the user to use the one or more applications on the client device;

recording the user interactions with the graphical user interface while the user uses the one or more applications on the client device; and storing the recorded user interactions.

3. A method for constructing a validation trace using a real network without causing privacy concerns, the method comprising the steps of:

providing a client device which has one or more applications operating thereon and a graphical user interface;

recording user interactions on the client device;

extracting usage scenarios from real network traffic in the real network;

emulating user actions on the client device according to a specific user scenario by utilizing the recorded user interactions and the extracted usage scenarios to generate additional real traffic in the real network, wherein the extracting step further includes the steps of:

storing user plane traffic and cell level event measurements taken from the real network;

extracting at least a portion of the stored user plane traffic and the stored cell level event measurements to obtain the usage scenarios: and storing the usage scenarios; and creating the validation trace based on the generated additional real traffic and the extracted usage scenarios.

4. The method of claim 1, wherein the usage scenarios extracted from the real network traffic in the real network do not contain information that identifies a client device or a user.

5. The method of claim 1, wherein the recording step and the extracting step are performed at different times.

6. The method of claim 1, wherein the emulating step further includes the steps of:

obtaining the extracted usage scenarios;

obtaining the recorded user interactions;

emulating the user actions on the client device according to the specific user scenario by utilizing the recorded user interactions and the extracted usage scenarios to generate additional real traffic in the real network; and storing the generated additional real traffic.

7. A method for constructing a validation trace using a real network without causing privacy concerns, the method comprising the steps of:

providing a client device which has one or more applications operating thereon and a graphical user interface;

recording user interactions on the client device;

extracting usage scenarios from real network traffic in the real network:

emulating user actions on the client device according to a specific user scenario by utilizing the recorded user interactions and the extracted usage scenarios to generate additional real traffic in the real network, wherein the emulating step further includes a step of synchronizing the client device with another client device where one of the client devices makes a call and other client device receives the call; and creating the validation trace based on the generated additional real traffic and the extracted usage scenarios.

8. A method for constructing a validation trace using a real network without causing privacy concerns, the method comprising the steps of:

providing a client device which has one or more applications operating thereon and a graphical user interface;

recording user interactions on the client device;

extracting usage scenarios from real network traffic in the real network;

emulating user actions on the client device according to a specific user scenario by utilizing the recorded user interactions and the extracted usage scenarios to generate additional real traffic in the real network; and creating the validation trace based on the generated additional real traffic and the extracted usage scenarios; wherein the creating step further includes the steps of:

obtaining a plurality of trace fragments from the generated real traffic;

obtaining the extracted usage scenarios;

multiplying the generated real traffic trace fragments using the extracted usage scenarios to create the validation trace; and storing the validation trace.

9. The method of claim 1, wherein the recorded user interaction and the extracted usage scenarios lack information identifying a real user or real client device in the real network.

10. A system for constructing a validation trace using a real network without causing privacy concerns, the system comprising:

a client device which has one or more applications operating thereon and a graphical user interface;

a recording device that records user interactions on the client device;

an extracting device that extracts usage scenarios from real network traffic in the real network;

a graphical user interface testing tool that emulates user actions on the client device according to a specific user scenario by utilizing the recorded user interactions and the extracted usage scenarios to generate additional real traffic in the real network; and a creating device that creates the validation trace based on the generated additional real traffic and the extracted usage scenarios.

11. The system of claim 10, wherein the recording device further stores the recorded user interactions.

12. A system for constructing a validation trace using a real network without causing privacy concerns, the system comprising;

a client device which has one or more applications operating thereon and a graphical user interface;

a recording device that records user interactions on the client device;

an extracting device that extracts usage scenarios from real network traffic in the real network, wherein the extracting device extracts the usage scenarios from databases containing user plane traffic and cell level event measurements taken from the real network and stores the extracted usage scenarios;

a graphical user interface testing tool that emulates user actions on the client device according to a specific user scenario by utilizing the recorded user interactions and the extracted usage scenarios to generate additional real traffic in the real network; and a creating device that creates the validation trace based on the generated additional real traffic and the extracted usage scenarios.

13. The system of claim 10, wherein the usage scenarios extracted from the real network traffic in the real network do not contain information that identifies a client device or a user.

14. The system of claim 10, wherein the recording device records the user interactions at a different time than when the extracting device extracts the usage scenarios from the real network.

15. The system of claim 10, wherein the graphical user interface testing tool stores the generated additional real traffic.

16. A system for constructing a validation trace using a real network without causing privacy concerns, the system comprising:
- a client device which has one or more applications operating thereon and a graphical user interface;
- a recording device that records user interactions on the client device;
- an extracting device that extracts usage scenarios from real network traffic in the real network;
- a graphical user interface testing tool that emulates user actions on the client device according to a specific user scenario by utilizing the recorded user interactions and the extracted usage scenarios to generate additional real traffic in the real network, wherein the graphical user interface testing tool synchronizes the client device with another client device where one of the client devices makes a call and other client device receives the call; and
- a creating device that creates the validation trace based on the generated additional real traffic and the extracted usage scenarios.

17. A system for constructing a validation trace using a real network without causing privacy concerns, the system comprising:
- a client device which has one or more applications operating thereon and a graphical user interface;
- a recording device that records user interactions on the client device;
- an extracting device that extracts usage scenarios from real network traffic in the real network;
- a graphical user interface testing tool that emulates user actions on the client device according to a specific user scenario by utilizing the recorded user interactions and the extracted usage scenarios to generate additional real traffic in the real network; and
- a creating device that creates the validation trace based on the generated additional real traffic and the extracted usage scenarios, wherein the creating device multiplies a plurality of trace fragments from the generated additional real traffic with the extracted usage scenarios to create the validation trace and then stores the validation trace.

18. The system of claim 10, wherein the recorded user interaction and the extracted usage scenarios lack information identifying a real user or real client device in the real network.

19. A graphical user interface testing tool for constructing a validation trace using a real network without causing privacy concerns, the graphical user interface testing tool comprising:
- a processor; and
- a memory that stores processor-executable instructions wherein the processor interfaces with the memory and executes the processor-executable instructions to:
- obtain user interactions that were recorded when a user interacted with a client device which has one or more applications operating thereon and a graphical user interface;
- obtain usage scenarios that were extracted from real network traffic in the real network;
- emulate user actions on the client device according to a specific user scenario by utilizing the user interactions and the usage scenarios to generate additional real traffic in the real network; and
- store the generated additional real traffic, wherein the stored generated additional real traffic and the usage scenarios are used to create the validation trace.

20. A method implemented by graphical user interface testing tool for constructing a validation trace using a real network without causing privacy concerns, the method comprising the steps of:
- obtaining user interactions that were recorded when a user interacted with a client device which has one or more applications operating thereon and a graphical user interface;
- obtaining usage scenarios that were extracted from real network traffic in the real network;
- emulating user actions on the client device according to a specific user scenario by utilizing the user interactions and the usage scenarios to generate additional real traffic in the real network; and
- storing the generated additional real traffic, wherein the stored generated additional real traffic and the usage scenarios are used to create the validation trace.

* * * * *

UNITED STATES PATENT AND TRADEMARK OFFICE
CERTIFICATE OF CORRECTION

PATENT NO. : 8,280,956 B2
APPLICATION NO. : 12/857684
DATED : October 2, 2012
INVENTOR(S) : Szabo et al.

It is certified that error appears in the above-identified patent and that said Letters Patent is hereby corrected as shown below:

On the Title page, Item (73), under "Assignee", delete "Telefonakitiebolaget" and insert -- Telefonaktiebolaget --, therefor.

In Column 7, Line 37, delete "tools editcap" and insert -- editcap tools --, therefor.

In Column 9, Line 8, in Claim 1, delete "ea traffic" and insert -- real traffic --, therefor.

In Column 9, Line 34, in Claim 3, delete "scenarios: and" and insert -- scenarios; and --, therefor.

In Column 9, Line 59, in Claim 7, delete "network:" and insert -- network; --, therefor.

In Column 10, Lines 48-49, in Claim 12, delete "comprising;" and insert -- comprising: --, therefor.

Signed and Sealed this
Eleventh Day of December, 2012

David J. Kappos
*Director of the United States Patent and Trademark Office*